Patented Nov. 20, 1923.

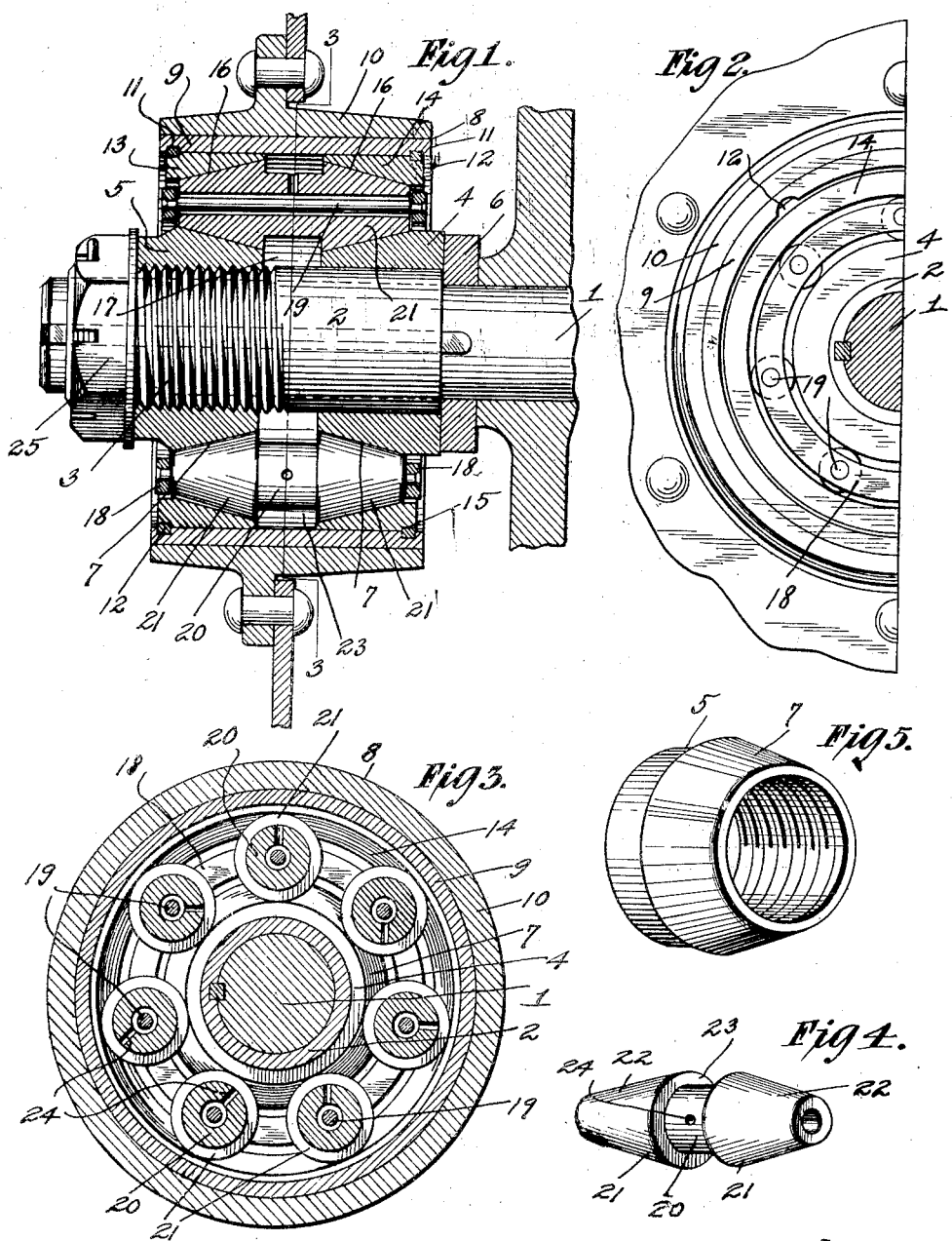

1,474,600

UNITED STATES PATENT OFFICE.

CHARLES E. McNUTT, OF COLUMBUS, OHIO.

ROLLER BEARING.

Application filed July 30, 1921. Serial No. 488,518.

*To all whom it may concern:*

Be it known that CHARLES E. McNUTT, a citizen of the United States, residing at Columbus, in the county of Franklin and State of Ohio, has invented certain new and useful Improvements in Roller Bearings, of which the following is a specification.

This invention relates to improvements in roller bearings, and has for its primary object to provide a roller bearing of efficient, reliable and compact construction and capable of being produced and maintained at low costs.

The invention consists in a roller bearing wherein is embodied spaced inner and outer concentrically disposed race rings, the said race rings being formed to include reversely inclined, conical, annular bearing surfaces, which define continuous raceways of outwardly converging formation, and in positioning anti-friction rollers within said raceways for movement between the race rings, the said rollers being longitudinally tapered at the ends thereof in reverse directions to conform with the bearing surfaces and are rotatable about axes positioned parallel with the major axis of rotation of the bearing.

Another important object of the invention resides in the provision of a roller bearing embodying the aforesaid structural characteristics and capable thereby of possessing the ability to carry heavy loads, both thrust and radial, or a combination of the two, and to embody in the bearing features of construction whereby adjustment may be made to compensate for the effects of wear, the adjustment provided being a part of the bearing itself.

Other objects of the invention reside in the provision of a bearing which may be properly lubricated, and wherein the parts thereof are readily accessible, to permit of replacements and adjustments and wherein the outer ring is formed to include resilient arcuate keys for retaining the various parts of the bearing in assembled relation.

For a further understanding of the invention, reference is to be had to the following description, and to the accompanying drawing, wherein:

Figure 1 is a vertical longitudinal sectional view taken through the improved roller bearing comprising the preferred form of the present invention, Figure 2 is an end elevation of the bearing, Figure 3 is a vertical transverse sectional view taken on the plane indicated by the line 3—3 of Figure 1, Figure 4 is a detail perspective view of one of the roller elements, and Figure 5 is a similar view of one of the race rings.

Referring more particularly to the details of the invention, the numeral 1 designates a shaft or an axial support about which the bearing assembly may rotate or the shaft or axle support itself may be retained for rotation within the bearing assembly, in accordance with the particular use to which the bearing is adapted. In this instance, however, the shaft or axial support is provided with a bearing end 2, that is suitably exteriorly threaded as at 3. The bearing end of the shaft is provided with a pair of spaced longitudinally aligned inner rings 4 and 5, the surfaces of which may be said to constitute the inner race of the bearing. The inner ring 4 is loosely slipped over the bearing end 2 of the shaft and its longitudinal movement in an inward direction is limited and the position of the ring defined by means of a collar or other equivalent fixed abutment 6 mounted in connection with the shaft 1. The outer ring 5 is provided with a threaded bore, designed to be received upon the threaded end 3 of the shaft 1, and its operative position upon the shaft is governed by engagement with the roller assembly to be hereinafter specifically described. It will be observed that the rings 4 and 5 are provided with opposed conical bearing surfaces 7.

Concentrically surrounding the shaft 1 and the rings 4 and 5 is an outer housing 8. This housing is formed to include a sleeve 9, which may form a part of the hub of a rotatable member 10. The sleeve 9 has its ends provided with annular grooves 11, in which are positioned split locking keys 12, the latter serving to retain within the sleeve a pair of outer race rings 13 and 14. These rings closely conform to the inner diameter of the sleeve 9, and have their outer edges cut away as at 15 to receive the arcuate keys 12, the said keys serving when in position, to prevent the rings 13 and 14 from moving outwardly of the sleeve. The inner peripheries of the rings 13 and 14 are provided with reversely inclined annular bearing surfaces 16, which are also of opposed conical formation and cooperate with the surface 7 to produce annular raceways 17 in the inner and outer race rings. By reason of the presence of the conical surfaces 7 and 16 and their opposed locations or relative arrangement, the outer raceway will be of the greatest diameter at the interior of the bearing and of the smallest diameter toward the outer or exterior parts thereof. Thus, the race rings will be of annular V shaped formation wherein outwardly converging grooves are provided.

These raceways or grooves are adapted to receive the roller assembly of the bearing. This assembly consists essentially of a pair of retainer rings 18, located at the outer ends of the raceways 17, and the said rings carry connecting axles 19, which axles are disposed to extend parallel with the shaft 1, about which rotate double oppositely tapering roller elements 21. These elements are confined between the rings 18, and are permitted to freely rotate about the axles 19. These elements are of peculiar formation and, as shown, include oppositely extending substantially conical ends 22, which are adapted to conform with the configuration of the raceways 17 and more particularly to engage with the reversely inclined bearing surfaces provided upon the inner and outer race rings, an annular groove 23 being formed in each of the elements 21 between the conical ends 22 thereof, in order that the said elements will be spaced from the inner wall of the sleeve 9 and the outer part of the shaft 1 to produce a lubricant circulating space, oil ports 24 being in communication with the grooves 23 and the axle bore provided in each of the elements 21, in order that the lubricant may be transmitted freely to all the adjacent parts.

By this construction it will be apparent that the present invention provides a bearing wherein both end and radial thrusts or variations thereof can be readily taken care of. By reason of the double conical formation of the elements 21, it will be apparent that end thrusts in either direction will be absorbed, and similarly, all radial thrusts may be readily taken care of by the normal positions which the elements 21 occupy upon the raceways 17. Moreover, in the event of wear, the effects thereof may be readily eliminated by adjusting the ring 5. This ring may be longitudinally moved on the shaft 1 by being rotated, and accordingly the bearing may be tightened or loosened as desired. A lock nut 25 is suitably mounted in connection with the threaded end of the shaft for retaining the adjustable ring 5 in any of its set positions.

It will be observed that the adjustment for the bearing constitutes a unit of the bearing itself, and is not formed in connection with one of the members in which the bearing is confined, as is the usual practice.

What is claimed is:

A roller bearing comprising inner and outer spaced concentric race rings, the opposed ends of which being spaced, said race rings are formed to provide continuous raceways, retaining rings associated with the raceways, anti-friction rollers rotatable in the raceways and having axial bores, axles supported in spaced relation by the retaining rings and passing axially through the rollers of less diameter than the bores of said rollers, the ends of the rollers being spaced by an annular groove which registers with the space between the race rings to permit fluid communication between the grooves and bores.

In testimony whereof I affix my signature.

CHARLES E. McNUTT.